United States Patent [19]

Harrison, Jr.

[11] Patent Number: 4,712,804
[45] Date of Patent: Dec. 15, 1987

[54] ARTICLE CARRIER

[76] Inventor: Eddie Harrison, Jr., 2177 N. Stocker St., Pomona, Calif. 91767

[21] Appl. No.: 827,090

[22] Filed: Feb. 7, 1986

[51] Int. Cl.$^4$ .............................................. B62B 3/02
[52] U.S. Cl. .......................... 280/47.13 R; 16/114 R; 24/168; 294/15; 294/26; 294/153
[58] Field of Search .................... 280/47.13 R, 35, 37, 280/79.1 R, 79.1 A, 47.34, 493; 294/15, 26, 149, 151, 153; 16/30, 114 R, DIG. 24, DIG. 25; 24/168, 171, 194

[56] References Cited

U.S. PATENT DOCUMENTS

| | | | |
|---|---|---|---|
| 1,188,547 | 6/1916 | Lopez | 16/114 R |
| 2,132,316 | 10/1938 | Newton | 280/79.1 A |
| 2,174,468 | 9/1939 | Kratfel | 280/493 |
| 2,561,911 | 7/1951 | Cremona | 294/150 |
| 2,696,990 | 12/1954 | Davis | 280/35 |
| 2,832,521 | 4/1958 | Gardner | 294/150 |
| 3,119,160 | 1/1964 | Hoppeler | 294/74 |
| 3,276,084 | 10/1966 | Spranger | 24/171 |
| 3,343,862 | 9/1967 | Holmes | 294/74 |
| 3,524,543 | 8/1970 | Bundy et al. | 294/74 |
| 3,606,056 | 9/1971 | Morgan | 294/74 |
| 4,018,467 | 4/1977 | Salvesen | 294/31.2 |
| 4,432,689 | 2/1984 | Shell | 294/74 |

FOREIGN PATENT DOCUMENTS 252466  3/1927  Italy .............................. 280/47.13 R Primary Examiner—John J. Love
Assistant Examiner—Eric D. Culbreth
Attorney, Agent, or Firm—Frijouf, Rust & Pyle

[57] ABSTRACT

An article carrier for use with a strap secured to an article and an article moving device comprising a base member and a plate with a first and second inverted V-shaped member defining a flexible proximal leg and flexible distal leg extending from an apex of the inverted V-shaped member. The V-shaped members are axially spaced apart on the base member to enable the plate to be slidably received between the proximal and distal leg of each of the inverted V-shaped members. A handle with a first and second end is releasably secured to the apex of the first and second inverted V-shaped member thereby extending between each inverted V-shaped member. The proximal and distal leg of each of the inverted V-shaped members being secured to the base member to enable the plate to engage the proximal and distal leg of each inverted V-shaped member to enable the strap to pass between the base member and the plate and to enable the plate to exert pressure upon the strap and the base member upon tensioning the handle by the article carrying apparatus to enable movement of the article.

11 Claims, 10 Drawing Figures

ARTICLE CARRIER

BACKGROUND OF THE INVENTION

1. Field of the Invention

This invention relates to a lifting device, and more specifically to a moving and carrying device for use with a strap which is secured to an article or other object to be moved.

2. Description of the Prior Art

Numerous devices and methods are set forth in the prior art to easily and simply provide an apparatus which readily and easily attaches to an article to be moved.

One such attempt has been a carrying and tightening device which utilized a pair of belts wrapped around the article to be moved. A first end of each of the belts is secured to the interior of a housing and the other end is secured to a portion of a shaft which has a ratchet wheel secured to it and a pawl secured to one end of the housing being in engagement with the ratchet wheel such that when the shaft is rotated, the tension on each of the belts is increased thereby gripping the article to be moved.

In another attempt a handle secured to a base plate with a pair of upstanding end plates and a pair of parallel slots adjacent the end plates such that when the article is lifted by the handle, the handle engages a belt which runs through the parallel slots at each adjacent upstanding plate and tensions the belt thereby tightening the straps around the articles to be carried.

In another attempt a device for binding and for facilitating the transportation of an elongated object, such as split logs, comprised a rigid elongated spacer member and an elongated flexible cord. The flexible cord is secured to the spacer member and wrapped around the objects to be carried, then secured to the spacer member.

In a another device a sling assembly utilizes a particular choker member which serves to cinch the belt-type sling around the load.

Another prior art reference describes a packing device for supporting a plurality of boxes in a unitized pack. This device utilizes a loop which enables the pack to be lifted by an attaching hook of a crane or the like. The packages placed on this device are held in place by suitable strapping tied around the packages to retain them on the support members of the lifting device of this invention.

It is noted that the strapping may be of steel wire, plastic strands, tape or other materials which are used to draw the boxes tightly together so as to create friction on their adjacent sides and prevent them from shifting.

Another prior art reference describes a strap lift loading system by which a strapped load can be lifted from a position by a strap lift device over the load and horizontally slewing load lifting arms through the upper lifting strap and lifting the load by the strap. This device utilizes a previously strapped load.

Another prior art reference utilizes a carton carrier which includes a flat base upon which the article to be moved is placed. The device is described as a pair of traverse straps being spaced apart and attached to the base and an elongated handle fixedly attached to the one traverse strap and removably securable to the other traverse strap. In a further embodiment of the invention longitudinal straps are also used to securably contain the article to be carried on the support base.

Another prior art reference describes an apparatus for handling cargo utilizing flexible support straps. The device embraces a frame apparatus in combination with a cargo strap which holds the cargo immediately below a suspension frame free of any lower pallet or the like.

It is a primary objective of this invention to provide an apparatus which overcomes the aforementioned difficulties of the prior art devices and provides an improvement which is a substantial contribution to the advancement over the moving and carrying art.

Another object of this invention is to provide an article carrier which is readily attachable to a strap which is secured to an article, crate, or the like.

Another object of this invention is to provide an article carrier which increases its gripping power on a strap as the handle is tensioned.

Another object of this invention is to provide an article carrier which is easily attachable to an article which has a strap secured thereto to enable a person, a cargo crane, a forklift or the like to easily grasp the article carrier and if of sufficient strength, to carry the article.

Another object of this invention is to provide an article carrier which is easily attachable to an article which has a strap secured thereto to enable a person, a cargo crane, a forklift or the like to easily grasp the article carrier and if of sufficient strength, to pull the article.

Another object of this invention is to provide an article carrier which does not slide or slip relative the strap it is secured to.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention within the scope of the disclosure. Accordingly, other objects and a fuller understanding of the invention may be had by referring to the summary of the invention and the detailed description describing the preferred embodiment in addition to the scope of the invention defined by the claims taken in conjunction with the accompanying drawings.

SUMMARY OF THE INVENTION

This invention is defined by the appended claims of the specific embodiment shown in the attached drawings. For the purpose of summarizing the invention, the invention may be incorporated into an apparatus comprising an article, crate, or the like, moving device for cooperation with a strap secured to the crate to make possible the moving or lifting of the crate by a crate moving apparatus without the use of a cargo net, pallet or the like.

The article or crate moving device of the invention comprises a base member having a first side and a second side and a plate having a first end and a second end. A first inverted V-shaped member and a second inverted V-shaped member each defining a proximal leg and distal leg extending from an apex is disclosed. The first and second inverted V-shaped members are spaced apart on the base member to enable the first end and the second end of the plate to engage and be slidably received between the proximal and the distal legs of each of the first and second inverted V-shaped members thereby contacting the lower inner portion of the proximal and distal legs of the first and second inverted V-shaped members. A handle having a first end and a second end is releasably secured to the apex of the first inverted V-shaped member and the apex of the second inverted V-shaped member, respectively, thereby extending between and being attached to the first and second V-shaped members. The proximal leg and the distal leg of the first and second inverted V-shaped members are attached to the base member to enable the first end and the second end of the plate to engage and be slidably received between the proximal leg and distal leg of the first and second inverted V-shaped members. The proximal leg and distal leg of the first and second inverted V-shaped members are flexible to permit the strap to pass between the first side of the base member and the second side of the plate and to enable the plate to exert pressure upon the strap and the first side of the base member upon tensioning the handle by the crate carrying apparatus thereby squeezingly griping the strap which enables movement of the crate by the crate moving apparatus.

The first end and a second end of the plate preferably include a beveled edge to permit a contacting engagement of the lower inner portion of the proximal leg and the lower inner portion of the distal leg of the first and second inverted V-shaped members in a mating manner for enhanced application of pressure upon the strap by the plate when the handle is tensioned. The second side of the plate is flat to direct maximum contact to the strap and to the first side of the base member. The shape of the first side of the plate is preferably flat to permit the maximum opening between the bottom of the handle and the first side, or top, of the plate in order to allow the handle to be easily gripped by the article carrying device.

The inverted V-shaped members are made of a material which flexes and pushes inward against the first and second ends of the plate upon tensioning the handle of the apparatus of the invention thereby squeezingly gripping the strap between the plate and base number. The preferred material comprises spring steel.

The handle comprises an elongate rod having a first end and a second end. The first end of the elongate rod is attached at the apex of the first inverted V-shaped member and the second end of the elongate rod is attached at the apex of the second inverted V-shaped member thereby extending from the first inverted V-shaped member to the second inverted V-shaped member. The preferred form of attachment at the apex, is a releasable engagement with each apex to enable the inverted V-shaped members to be attached to the base member after the base member has been positioned under the tensioned strap which is secured to the article to be moved. The inverted V-shaped members are then placed on the base member and the handle securably attached to the apex of the first and second inverted V-shaped members. The plate is then slid or moved into position between the legs of the first inverted V-shaped member, over the strap, and between the legs of the second inverted V-shaped member. To utilize this embodiment, there must be access to the first and second aperture of the base member, discussed in detail below, in order to place the first and second inverted V-shaped members therethrough.

The elongate rod further includes a sleeve or hollow tube extending around the elongate rod to permit rotation by the sleeve relative the elongate rod. Preferably, the sleeve extends from the apex of the first inverted V-shaped member to the apex of the second inverted V-shaped member thereby providing a laterally non-slipping engagement of the sleeve relative the elongate rod. The composition of the sleeve comprises wood, Neoprene or the like. The composition of the elongate rod comprises steel, aluminum and other compositions and alloys with a high tensile strength in order to structurally withstand the weight of the article being carried or moved.

The base member further includes a first slot and a second slot positioned on the base member to guidably receive the strap to retard twisting of the base member relative the strap when moving the article. The first slot and the second slot each further include first, second and third sides. The first side and the second side of the first slot and the second slot preferably include a ridge member which extends perpendicular relative the base member to further impede the twisting of the base member relative the strap. The most preferred shape of the ridge member is tapered downwardly or graduated with the highest portion proximate the third side of the slot. The composition of the base member comprises steel, aluminum and other compositions and alloys with a high tensile strength in order to structurally withstand the weight of the article being carried or moved.

Preferably, the base member further includes a first aperture and a second aperture with the first aperture axially spaced apart and parallel relative the second aperture for receiving the first inverted V-shaped member and second inverted V-shaped member, respectively. The first and second apertures include a proximal end and a distal end. The proximal end and distal end of the first and second apertures further include an opening adjacent the proximal end and the distal end of the first aperture and second aperture. The proximal and distal legs of the first and second inverted V-shaped members further include an upper end and a lower end. The lower end of the proximal and distal legs of the first and second inverted V-shaped members further include a foot portion extending substantially parallel relative the base member when positioned on the base member. The foot portion includes a first end and a second end. The second end of the foot portion further includes an arm member extending substantially perpendicular relative the foot portion to enable the first and second inverted V-shaped member to be releasably received in the first and second aperture of the base member, respectively, and the arm members to be received in the opening adjacent the proximal and distal ends of the first and second apertures to securely and releasably attach the inverted V-shaped member to the base member.

The second side of the base member preferably includes a resilient covering to protect the article from scratches, scrapes and the like, during any contact of the article being moved or carried by the second side of the base member. The resilient covering includes a felt pad or the like glued or otherwise affixed to the second side of the base member.

The first side of the base member and the second side of the plate preferably include a roughened surface to enhance the gripping of the strap upon tensioning the handle by the article carrying apparatus and to enhance the prevention of movement of the article carrier of the invention relative the strap.

The article carrier further includes a plurality of caster means for cooperation with the straps secured to the article for wheelingly supporting the article. Each of the caster means includes a block having a first and second end and an aperture extending from the first end of the block to the second end of the block to enable the passage through the block of the strap secured to the article. A swivel frame with a first and second end enables the first end to pivot freely relative the second end of the swivel frame. The block further includes a first side and a second side. The first side of the block being proximate the article when secured by the strap to the article. The first end of the swivel frame further includes an attachment means for securely attaching the first end of the swivel frame to the second side of the block. The second end of the swivel frame includes a rotatably mounted wheel to enable stable and supported movement of the article along a lateral plane.

The preferred number of caster means secured to the article is four to enable stable and supported movement of the article along a lateral plane.

The block preferably includes a slot, which is narrower than the aperture and slightly wider than the strap, extending from the first end of the block to the second end of the block and extending from the first side of the block into the aperture to enable the strap to be received through the slot and into the aperture.

Another embodiment of the invention comprises an article carrier attached by straps, or the like, to each of a number of articles having a sufficient number of caster means securably attached by the same or different straps, or the like, to enable stable and supported movement along a lateral plane by each of the plurality of articles and further including a plurality of transbars to connect the articles together. A first article carrier is secured to a first article. A first transbar includes a proximal end and a distal end. The proximal end of the first bar comprises a hook means for securably and releasably attaching the first bar to the handle of the first article carrier secured to the first article. The distal end of the first transbar comprises an attachment means. A second article carrier is secured to a second article. A second transbar includes a proximal end and a distal end. The distal end of the second transbar comprises an attachment means to securably link the distal end of the second transbar to the attachment means of the distal end of the first transbar. The proximal end of the second transbar comprises a hook means for securably and releasably attaching the second transbar to the second article carrier secured to the second article. The third article carrier is secured to the second article to enable an article moving apparatus to grasp the handle thereby permitting lateral movement of the first and second articles by the article moving apparatus by tensioning the handle of the third article carrier and moving.

The preferred construction of the hook means includes a resilient inner pad which establishes a friction fit with the handle of the article carrier when the hook means is secured to the handle. The preferred attachment means to link the distal ends of the first and second transbars is an aperture at each distal end of the first and second transbar enabling a pin to pass through each aperture to securely interlink the first and second bars.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception of the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION

Figure 1:
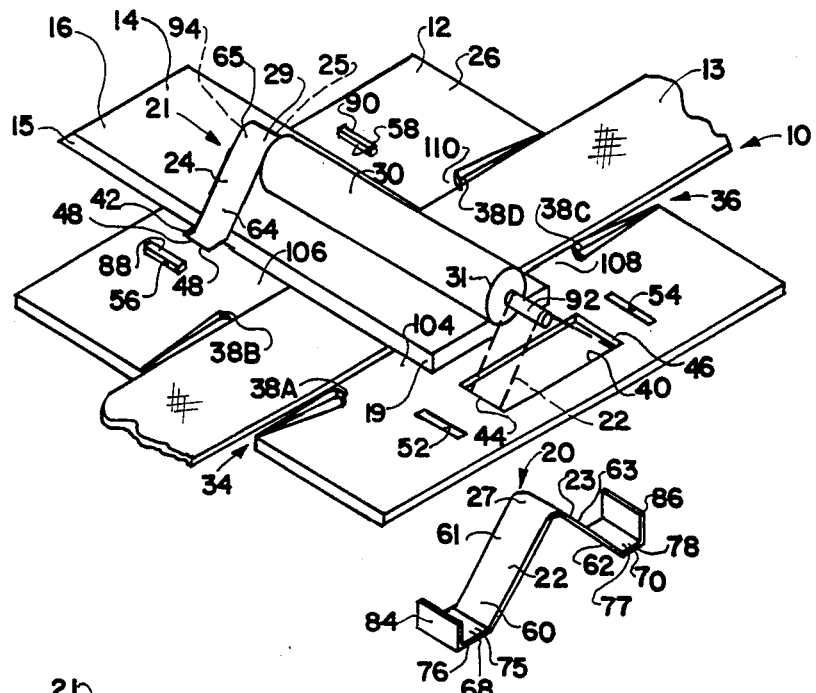
FIG. 1 is a partially exploded perspective view of the article carrier.

FIG. 1 is a partial expoded perspective view of the article carrier generally designated 10 illustrating the working position of the strap 13 relative the base member 12 and the plate 14. The apparatus of the invention enables a moving device to move an article 11 (not shown) previously securably fitted with strap 13 by sliding base member 12 between strap 13 and article 11.

The article carrier of the invention 10 comprises a base member 12 having a first side 26 and a second side 28, a plate 14 having a first end 15 and a second end 17 (not shown) and a first inverted V-shaped member 20 and a second inverted V-shaped member 21 each defining proximal legs 22 and 24 respectively. First inverted V-shaped member 20 also defines a distal leg 23 to complete the inverted "V" shape as shown in FIG. 1. Second inverted V-shaped member 21 symmetrically defines a distal leg 25 (shown in FIG. 1 in phantom lines) to complete the inverted "V" shaped member 21. The first 20 and second 21 inverted V-shaped members are axially spaced apart and parallel on the base member 12 to enable the first end 15 and the second end 17 of the plate 14 to engage and be slidably received between the proximal legs 22,24 and distal legs 23,25 of each of the inverted V-shaped members 20,21. This positions the first end of the plate 15 in contact with the inner lower portion of the proximal legs of the first 20 and second 21 inverted V-shaped member and the second end of the plate 17 in contact with the inner lower portion of the distal legs of the first 20 and second 21 inverted V- shaped members, respectively. The proximal legs 22,24 and the distal legs 23,25 of the inverted V-shaped members 20,21 respectively are flexible. In the preferred embodiment of the invention, the inverted V-shaped members 20,21 comprise spring steel. A handle 30 further including an elongate bar having a first end 92 and second end 94 forms the article moving grasping portion of the apparatus of the invention 10 with the first end 92 and the second end 94 being releasably secured to the apex 27 of the first inverted V-shaped member 20 and the apex 29 of the second inverted V-shaped member 21, respectively. This positions the handle to extend between the first V-shaped member 20 and the second V-shaped member 21 and above the plate 14 to enable the article moving apparatus to grap the handle 30 about its outer circumference 31. The proximal 22,24 legs and distal 23,25 legs of the first 20 and second 21 inverted V-shaped members are attached to the base member 12 to enable the first end 15 and second end 17 of the plate to engage and be slidably received between the proximal 22,24 legs and distal 23,25 legs of the first 20 and second 21 inverted V-shaped members. The plate 14 also includes a first side 16 and a second side 18. The proximal 22,24 legs and distal 23,25 legs of the first 20 and second 21 inverted V-shaped members are flexible to enable strap 13 to pass between the first side 26 of the base member 12 and the second side of plate 18 and to enable plate 14 to exert a pressure upon strap 13 and the first side of the base member 26 to prevent the article carrier from slipping relative to strap 13 upon tensioning the handle 30 by the article carrying apparatus (not shown). Upon grasping the handle 30 of the article carrying device of the invention, the article moving apparatus can move the article assuming that article moving apparatus has sufficient power or strength to do so.

In the preferred embodiment of the invention, the article carrier 10 comprises in combination a base member 12 having a first aperture 40 and second aperture 42 with the first aperture 40 axially spaced apart and parallel relative the second aperture 42. The first aperture 40 and second aperture 42 further include proximal ends 44,48 and distal ends 46,50, respectively, with an opening 52 adjacent proximal end 44 of the first aperture 40 and an opening 54 adjacent the distal end 46 of the first aperture 40. The first aperture 40 of the base member 12 receives therethrough the first inverted V-shaped member 20, and the second aperture 42 of the base member 12 receives therethrough the second inverted V-shaped member 21. This enables the first 27 and second 29 apexes of the first 20 and second 21 V-shaped members, respectively, to project above base member 12 and to permit the attachment of the first 20 and second 21 V-shaped members to the base member 12 as will be described in more detail below.

The plate 14 of the article carrier apparatus 10 includes a first end 15 and second end 17 to enable the plate to engage and be slidably received between the proximal 22,24 legs and distal 23,25 legs of the first 20 and second 21 inverted V-shaped members to permit the first end 15 and second end 17 of the plate to abut with the proximal legs 22,24 and distal legs 23,25 of the first 20 and second 21 inverted V-shaped members. The plate 14 further includes a first side 16 and second side 18 such that the first side 26 of the base member 12 and the second side 18 of the plate 14 squeezingly grip strap 13 when the article carrier 10 is in a working position.

The first 20 and second 21 inverted V-shaped members define proximal legs 22,24 and distal legs 23,25 extending from apexes 27,29, respectively. The first 20 and second 21 inverted V-shaped members are axially spaced apart on the base member 12 to permit the first end 15 and second end 17 of the plate to be slidably received between the proximal legs 22,24 and distal legs 23,25 of the first 20 and second 21 inverted V-shaped members, respectively.

A handle 30 with a first end 92 is releasably secured to the apex 27 of the first inverted V-shaped member 20 and the second end of the handle 94 is releasably secured to the apex 29 of the second inverted V-shaped member 21 thereby extending between the first inverted V-shaped member 20 and second inverted V-shaped member 21. The handle 30 projects above relative base member 12 to enable the article carrying apparatus, such as a hand, forklift tine or the like, to grip handle 30 without interference from the other elements of the article carrying apparatus 10, such as the plate 14 or base member 12.

The inverted V-shaped members 20,21 may be affixed to first side 26 of base member 12 by any method or design which will allow the proximaldistal leg pairs 22,23 and 24,25, respectively, to move inward in order to squeeze downwardly on push plate 14 toward strap 13 and in combination with first side of 26 of base member 12 present a compressing grip on strap 13. Angle A formed by proximal leg 22 and distal leg 23 is the same as the angle formed by proximal leg 24 and distal leg 25. Preferably, this angle is about 60 degrees.

The proximal legs 22,24 and distal legs 23,25 of the first 20 and second 21 inverted V-shaped members are flexible to permit the strap 13 to pass between the first side 26 of the base member 12 and the second side 18 of the plate 14. This forces plate 14 to exert a downward pressure relative to strap 13 and further permits the first side 26 of the base member 12 to move toward strap 13 upon tensioning the handle 30 by the article carrying apparatus (not shown) to prevent the article carrier 10 from slipping relative to the strap and thereby enabling the movement of the article by an article moving or carrying device of a sufficient strength to accomplish this task.

Preferably, first end 15 and second end 17 of the plate 14 are bevelled 19 to permit the engagement of the proximal legs 22,24 and distal legs 23,25 of the first 20 and second 21 inverted V-shaped members in mating engagement for enhanced application of the compressive force upon the strap 13 by the plate 14 and the base member 12 when the handle 30 is tensioned or lifted by the article moving device.

Base member 12 further includes a first slot 34 and second slot 36 which permits strap 13 to be guided and positioned. The first slot 34 and second slot 36 of the base member 12 further include first sides 104,108 and second sides 106,110, respectively. The first sides 104,108 and second sides 106,110 of each first 34 and second 36 slots further include ridges 38A, 38B, 38C, 38D, respectively which extends perpendicular relative the base member 12 to further impede the twisting of the base member 12 relative the strap 13. Preferably, ridges 38A, 38B, 38C and 38D are tapered to facilitate the positioning of the base member relative the tensioned strap.

Figure 1A:
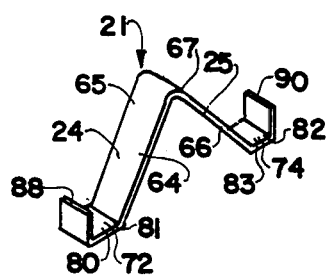
FIG. 1A is a view of the second inverted V-shaped member.

The proximal leg 22 and distal leg 23 of the first 20 inverted V-shaped member further include lower ends 60,62 and upper ends 61,63 respectively. The proximal leg 24 and distal leg 25 of the second inverted V-shaped member 21 further include lower ends 64,66 and upper ends 65,67, respectively as seen in FIG. 1A. The lower ends 60,62 of the proximal leg 22 and distal leg 23 respectively of the first inverted V-shaped member 20 further include foot portions 68,70 respectively which extend substantially parallel relative the base member 12 when positioned thereon. The lower ends 64,66 of the proximal leg 24 and distal leg 25 of the second inverted V-shaped member 21 further include foot portions 72,74 respectively which extend substantially parallel relative the base member 12. The foot portion 68 of the lower end of the proximal leg 60 and the foot portion 70 of the lower end of the distal leg 62 of the first inverted V-shaped member 20 further include a first end 75,77 and second end 76,78, respectively. The foot portion 72 of the lower end of the proximal leg 64 and the foot portion 74 of the lower end of the distal leg 66 of the second inverted V-shaped member 21 further include first ends 81,83 and second ends 80,82, respectively. The second end 76 of the foot portion 68 of the lower end of proximal leg 60 and the second end 78 of foot portion 70 of distal leg 62 of the first inverted V-shaped member 20 further include an arm member 84,86 respectively which extends upward relative the foot portion to enable the arm member 84 to be received through the opening 52 adjacent the proximal end 44 of the first aperture 40 of base member 12 and arm member 86 to be received through opening 54 adjacent the distal end 46 of the first aperture 40 of the base member 12. The second end 80 of the foot portion 72 of the lower end of proximal leg 64 and the second end 82 of the foot portion 74 of the lower end 66 distal leg 25 of the second inverted V-shaped member 21 further include arms member 88,90 respectively which extend upward relative the foot portion to enable arm member 88 to be received through the opening 56 adjacent the proximal end 48 of the second aperture 42 of base member 12 and arm member 90 to be received through opening 58 adjacent the distal end 50 of the second aperture 42 of the base member 12.

Figure 2:
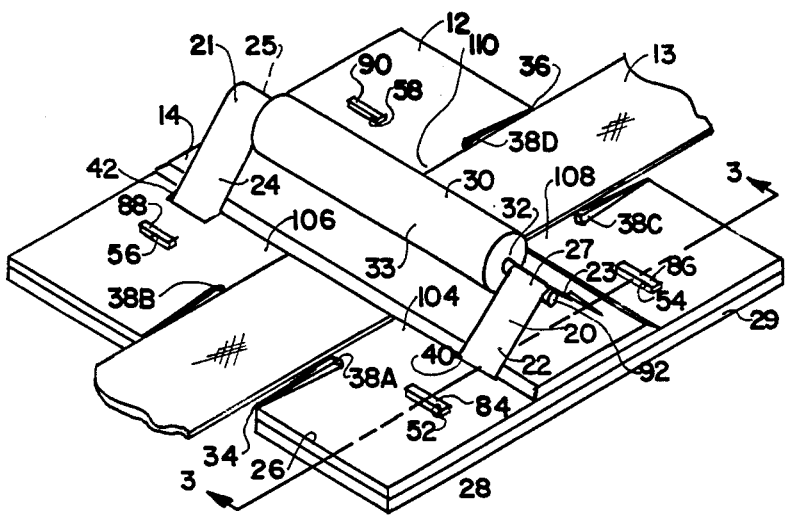
FIG. 2 is a perspective view of the article carrier.

FIG. 2 is a perspective view of the apparatus of the invention illustrated in a working configuration with the strap 13 passing over base member 12 and beneath plate 14 with the first slot 34 and second slot 36 guidably receiving the strap 13. For enhanced containment of strap 13, ridges 38A,B,C,D are positioned parallel the strap 13 and adjacent the first slot 34 and second slot 36 to permit the strap 13 to pass parallel to the ridges 38A,C,B,D and the first 104,108 and second side 106,110 of the first slot 34 and second slot 36, respectively. The first 20 and second 21 inverted V-shaped members project through the first aperture 40 and second aperture 42, respectively, of base member 12. Arm 84 of proximal leg 22 passes through opening 52 of base member 12, arm 86 of distal leg 23 passes through opening 54 of base member 12, arm 88 of proximal leg 24 passes through opening 56 of base member 12 and arm 90 of distal leg 25 passes through opening 58 of base member 12 thereby enabling first 20 and second 21 inverted V-shaped members 12 to be securely attached to base member 12. Apex 27 of the first inverted V-shaped member 20 supportingly engages by means of a friction fit the first end 92 of elongate bar 32 of handle 30. Apex 29 of the second inverted V-shaped member 21 supportingly engages by means of a friction fit the second end 94 of elongate rod 32 of handle 30. Handle 30 is held in apexes 27,29 of the first 20 and second 21 inverted V-shaped members, respectively by the force tensioning the handle. When the handle is not tensioned, handle 30 is secured at apex 27,29 by a friction fit. In a further embodiment, on the second side 28 of base member 12 a resilient pad 29A is attached thereto to retard scratches, mars and the like by the second side of the base member 28 relative article 11.

Figure 3:
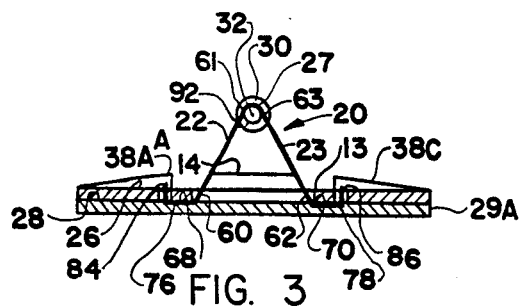
FIG. 3 is a sectional view along the line 3—3 of FIG. 2.

FIG. 3 is a sectional view taken along line 3—3 of FIG. 2 of the preferred embodiment of the inverted V-shaped member 20. The first and second inverted V-shaped members 20,21 are similar in construction. Accordingly, a description of the first inverted V-shaped member 20 describes the second V-shaped member 21. As illustrated at FIGS. 1 and 3, the proximal 22 and distal 23 legs have upper ends 61,63 and lower ends 60,62. The lower ends 60,62 of the inverted V-shaped member 20 further include foot portions 68,70 having second ends 76,78 respectively. The second ends 76,78 of the foot portions 68,70 further include arm members 84,86 respectively. The upper ends 61,63 of the proximal leg 22 and distal leg 23 of the inverted V-shaped member 20 defines an apex 27 for the securable reception of the first end 92 elongated bar 32 of the handle 30. In a further embodiment, the second side 28 of base member 12 includes a resilient pad 29A attached thereto to retard scratches, mars and the like by the second side of the base member 28 relative article 11.

Figure 4:
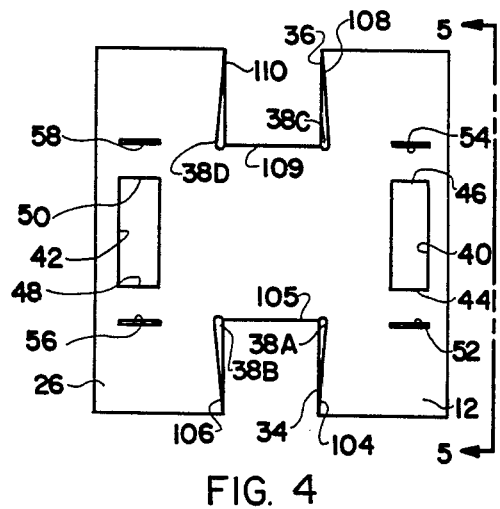
FIG. 4 is a plan view of the base member.

FIG. 4 is a plan view of base member 12 illustrating the first 40 and second 42 apertures axially spaced apart and parallel relative to each other. The proximal end 44 of the first aperture 40 and the distal end 46 of first aperture 40 further include openings 52,54 adjacent the proximal end 44 and distal end 46, respectively. The second apertures 42 of the base member 12 further includes a proximal end 48 and distal end 50 which further includes an opening 56,58 adjacent to the proximal end 48 and distal end 50, respectively. The openings 52,54,56,58 adjacent the first and second apertures 40,42 enable the reception therethrough of the arm members 84,86,88,90 of the first 21 and second 22 inverted V-shaped members, respectively.

FIG. 4 further illustrates the first slot 34 and second slot 36 of base member 12. The first slot 34 and second slot 36 further include first 104,108 sides, second 106,110 sides and third 105,109 sides, respectively. First slot 34 and second slot 36 extend through base member 12 to guidably receive strap 13. The first slot 34 further includes a tapered ridge 38A adjacent first side 104 and a tapered ridge 38B adjacent second side 106 of first slot 34. The second slot 36 further includes a tapered ridge 38C adjacent first side 108 and a tapered ridge 38D adjacent second side 110 of second slot 36. Ridges 38A–D keep strap 13 stable when the load shifts and also aid in keeping plate 14 against strap 13. Preferably, base member 12 is flat.

Figure 5:
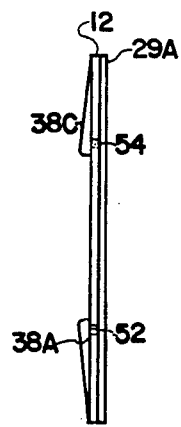
FIG. 5 is a right side view of FIG. 4.

FIG. 5 illustrates a right side view of the base member with resilient pad 29A attached to the second side 28 of base member 12.

Figure 6:
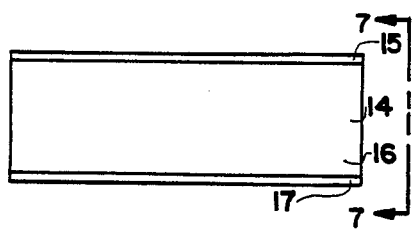
FIG. 6 is top view of the preferred embodiment of the plate.

FIG. 6 illustrates plate 14 showing the first 15 and second 17 ends which are bevelled 19. The plate 14 further includes a first side 16 and second side 18. The second side 18 of the plate 14 may be roughened in order to increase the grip of plate 14 relative strap 13. Also, the base member 12 which contacts strap 13 may also be roughened to increase the grip of the base member 12 relative the strap 13.

Figure 7:
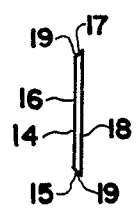
FIG. 7 is a right side view long line 7—7 of FIG. 6.

FIG. 7 is a right side view along line 7—7 of FIG. 6 illustrating preferred beveled edge 19 of first end 15 and second end 17 of plate 14.

Figure 8:
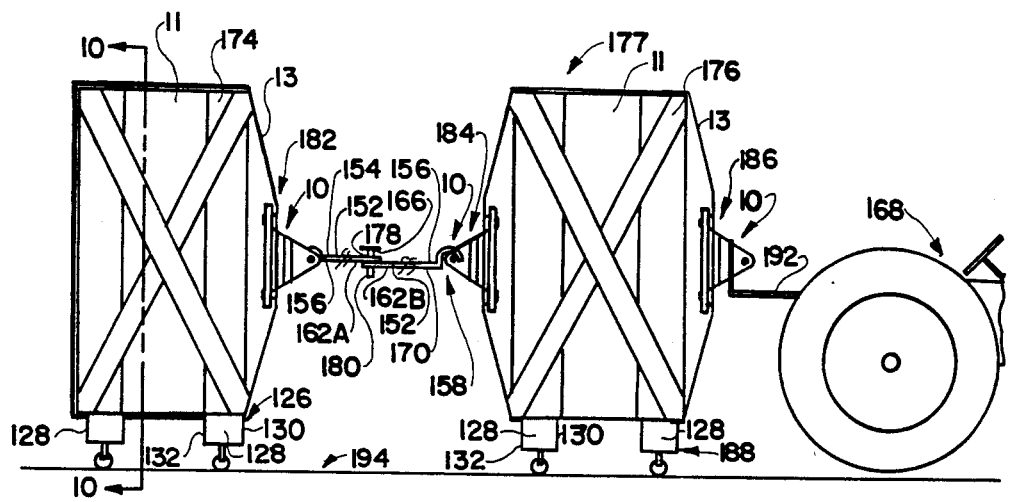
FIG. 8 is a side view of a plurality of articles with the article carrier attached and with the articles secured together by transbars and an article moving apparatus connected to an article carrier for movement along a lateral plane.
Figure 10:
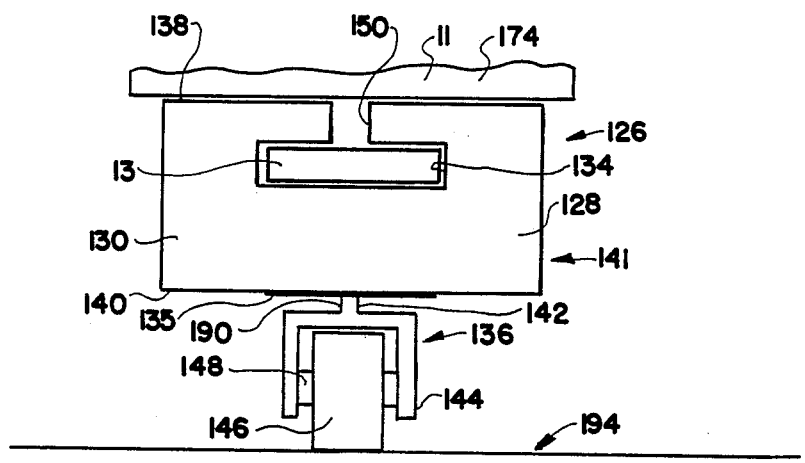
FIG. 10 is a partial sectional view along line 10—10 of FIG. 8

FIG. 8 illustrates a plurality of caster means 188. Each single caster means 126 is secured by strap 13 to the article 11 for wheelingly supporting article 11. Caster means 126 include block 128 having a first end 130 and a second end 132 with aperture 134 extending from the first end 130 of block 128 to the second end 132 of block 128 to enable the passage through block 128 of strap 13 secured to article 11, as best illustrated at FIG. 10. Block 128 further includes a first side 138 and second side 140 with first side 138 being proximate article 11 when secured by strap 13 to article 11. Swivel frame 136 having a first end 142 and a second end 144 to enable the first end 142 to pivot freely relative the second side 140 of block 128. The first end 142 of swivel frame 136 further includes an attachment means 141 for securely attaching the first end 142 of the swivel frame 136 to block 128. An attachment means for attaching the first end 142 of swivel frame 136 to the second side 140 of block 128 is a mounting plate 135 to attach the first end of swivel frame 142 to the second side 140 of block 128 by screws, or the like, to permit the pivoting of swivel frame 136 relative the second side 140 of block 128. The mounting plate 135 includes an aperture (not shown) extending into block 128 to permit the rotatable reception of axle 190 to permit the rotation of axle 190 relative block 128. The second end 144 of swivel frame 136 includes axle 148 with rotatable wheel 146 rotatably mounted thereon to enable stable and supported movement of the article along a lateral plane. Preferably, aperture 134 of block 128 further includes slot 150 extending from the first end of block 130 to the second end of block 132 and extending from the first side of block 138 into aperture 134 to enable strap 13 to be received through slot 150 and into aperture 134.

FIG. 8 further illustrates the use of transbar 152 in moving a plurality of articles 177. First transbar 154 is connected to handle 30 of the first 182 article carrier device of the invention 10 which is attached to strap 13 which is secured to first article 174. Second transbar 170 is connected to handle 30 of the second 184 article moving device of the invention 10 which is attached to strap 13 which is secured to second article 176. The distal end 162A of first transbar 154 is securably attached to the distal end 162B of second transbar 178 by a connecting pin 166 which passes through aperture 178 (not shown) of transbar 154 and through aperture 180 (not shown) of second transbar 170. Only the location of apertures 178 and 180 is illustrated at FIG. 8; at FIG. 9. Apertures 178 and 180 are the same as aperature 164 illustrated at FIG. 9. Aperatures 164, 178 and 180 provide for the reception of pin 166. The third article carrying device 186 is attached to strap 13 of the second article 176 in a manner to permit article moving apparatus 168 to move the first article 174 and second article 176. Any number of articles may be linked together in the above described manner to enable stable and supported movement along a lateral plane.

Figure 9:
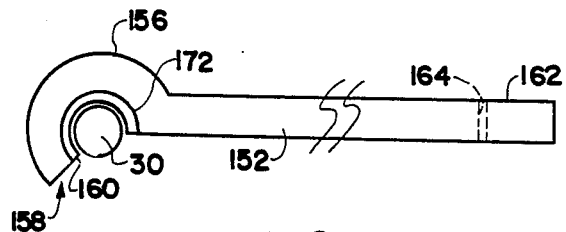
FIG. 9 is a side view of the transbar secured to the handle of the article carrier.

FIG. 9 illustrates transbar 152 attached to handle 30 of article carrier 10, not otherwise shown. Transbar 152 includes a proximal end 156 and a distal end 162. The distal end 162 includes aperture 164 as shown by phantom lines extending through the distal 162 end of transbar 152. The proximal end 156 of transbar 152 includes a hook means 158 for the reception therein of handle 30 in order to releasably secure transbar 152 to handle 30.

Preferably, hook means further includes a resilient pad 160 attached to the inner surface 172 of the hook means 158 to enable a friction fit with handle 30 when handle 30 is secured into hook means 158.

FIG. 10 is a partial front view of first article 174 illustrating caster means 126 and is discussed above at FIG. 8.

The article carrier of the invention can be used in moving a crate, parcel, or the like, along a horizontal plane, vertical plane or combination thereof relative the crate or parcel. The device of the invention may also aid in positioning an article being moved by, for example, a cargo crane by placing the article carrier at an accessible location along the strap to enable a workman to grasp the handle and position the article while it is held by the crane.

In order to use the device of the invention, a strap or belt comprising a gripable material must be secured or attached to the article intended to be moved. The strap or belt is a flat strip or thong of a flexible material, such as leather, or a woven material such as nylon or polypropylene. The exact shape of the cargo does not matter as long as a cargo strap, or the like, is secured or attached about the crate or cargo to be moved. There are numerous known methods of securing a belt or strap to a crate or article known to those skilled in the art. These methods do not form part of this invention. The belt or strap must be flat or ribbon-like and be able to pass between the inverted V-shaped members attached to the base member as illustrated at FIG. 2. This enables the base member and the plate to grip the strap when the handle is tensioned or lifted to prevent movement along the strap by the article carrier. Once the handle has been secured to the strap, any device capable of grasping or engaging the handle may be used, for example, a person, a forklift tine, a cargo crane, or the like, may use the device of the invention.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed:

1. An article carrier for cooperation with a strap secured to an article to be moved comprising:
   a base member having a first side and a second side;
   a plate having a first end and a second end;
   a first inverted V-shaped member and a second inverted V-shaped member each defining a proximal leg and distal leg extending from an apex;
   said first inverted V-shaped member and said second inverted V-shaped member being spaced apart on said base member to enable said first end and said second end of said plate to engage and be slidably received between each of said proximal leg and said distal leg of said first and of said second inverted V-shaped members;
   a handle with a first end and a second end;
   said first end of said handle and said second end of said handle releasably secured to said apex of said first inverted V-shaped member and said apex of said second inverted V-shaped member, respectively, thereby extending between each said V-shaped member;

said plate having a first side and a second side;

said proximal leg and said distal leg of each said first and second inverted V-shaped members being attached to said base member to enable said first end of said plate and said second end of said plate to engage and be slidably received between said proximal leg and said distal leg of each said inverted V-shaped member; and said proximal leg and said distal leg of each said inverted V-shaped member being flexible to enable said strap to pass between said first side of said base member and said second side of said plate and to enable said plate to exert pressure upon said strap and said first side of said base member upon tensioning said handle in use.

2. The article carrier of claim 1 wherein said first end and said second end of said plate are beveled to permit said first end of said plate and said second end of said plate to matingly abut said proximal leg and said distal leg respectively of each said first and second inverted V-shaped members for enhanced application of pressure upon said strap by said plate when said handle is tensioned in use.

3. The article carrier of claim 1 wherein said first and second inverted V-shaped members are spring steel.

4. The article carrier of claim 1 wherein said handle comprises an elongate rod.

5. The article carrier of claim 4 wherein said elongated rod further comprises a sleeve extending around said rod to enable rotation by said sleeve relative said elongated rod.

6. The article carrier of claim 1 wherein said second side of said plate is flat.

7. The article carrier of claim 1 wherein said base member further includes a first slot and a second slot positioned on said base member to guidably receive said strap to retard twisting of said base member relative to said strap when moving the article to be moved.

8. The article carrier of claim 7 wherein said first and said second slots of said base member further include a first side and a second side; and each said first side and said second side of said first and said second slots further include a ridge extending perpendicular relative to said base member to further impede twisting of said base member relative to said strap.

9. The article carrier of claim 8 wherein said ridge is tapered to facilitate the positioning of said base member relative to said strap.

10. The article carrier of claim 1 wherein said base member further includes a first aperture and a second aperture with said first aperture spaced apart and parallel relative said second aperture for receiving each of said first and second inverted V-shaped members;

said first aperture and said second aperture each having a proximal end and a distal end; and each said proximal end and said distal end of said first aperture and said second aperture further including an opening adjacent to said proximal end and said distal end of each said first aperture and said second aperture.

11. The article carrier of claim 10 wherein each said proximal leg and said distal leg of each said first and second inverted V-shaped members further includes a first end and a second end;

each said first end of each said first and second inverted V-shaped members further includes a foot portion extending substantially parallel relative said base member;

each said foot portion having a first end and a second end; and each said second end of each said foot portion further including an arm member extending upward relative said foot portion to enable said arm member to be securely received through said opening adjacent said proximal end and said distal end of said first aperture and said second aperture thereby enabling each said first and second inverted V-shaped members to be releasably received in each said first aperture and said second aperture of said base member and to securely attach each said first and second inverted V-shaped members to said base member.

* * * * *